Figure 1:
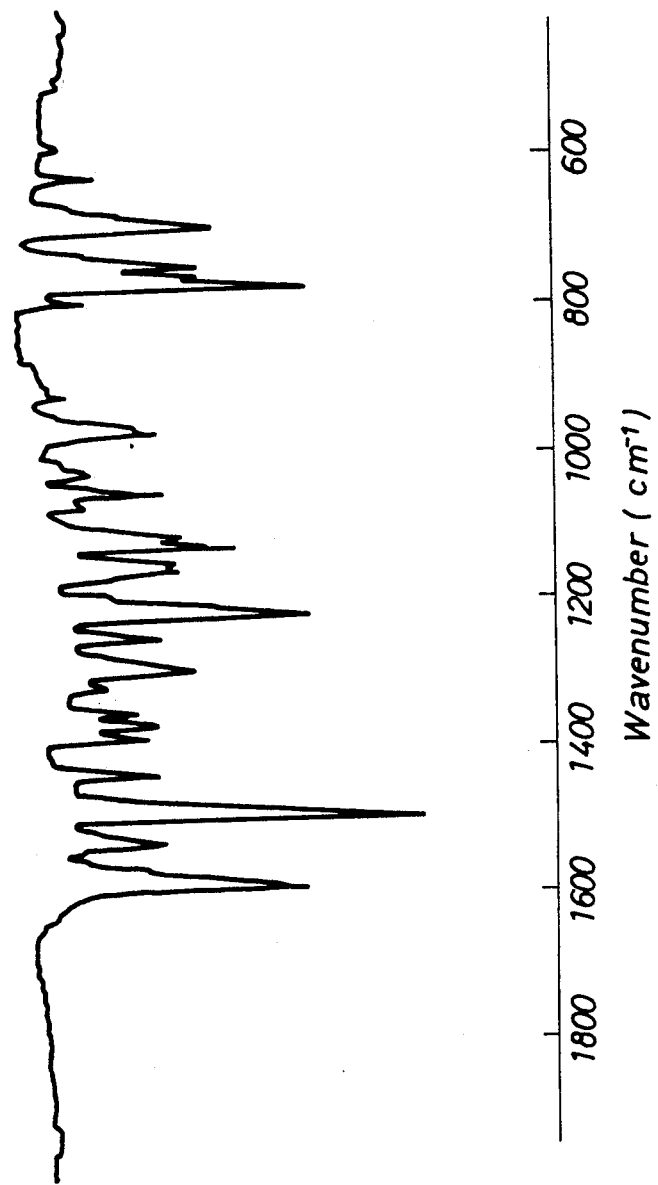

United States Patent [19]

Suzuki et al.

[11] Patent Number: 5,290,649
[45] Date of Patent: Mar. 1, 1994

[54] ELECTROPHOTOGRAPHIC PHOTORECEPTOR COMPRISING A PHOTOSENSITIVE LAYER CONTAINING A NAPHTHYLHYDRAZONE COMPOUND

[75] Inventors: Tetsumi Suzuki, Isehara; Hitoshi Ono, Yokohama; Osamu Ando, Kawasaki, all of Japan

[73] Assignee: Mitsubishi Chemical Industries Ltd., Tokyo, Japan

[21] Appl. No.: 246,916

[22] Filed: Sep. 16, 1988

Related U.S. Application Data

[63] Continuation of Ser. No. 10,329, Feb. 3, 1987, abandoned.

[30] Foreign Application Priority Data

Feb. 7, 1986 [JP] Japan ................................ 61-25093

[51] Int. Cl.$^5$ ............................................... G03G 5/06
[52] U.S. Cl. ............................................... 430/59; 430/73
[58] Field of Search ............................... 430/59, 73, 74

[56] References Cited

U.S. PATENT DOCUMENTS

| | | | |
|---|---|---|---|
| 3,473,883 | 10/1969 | Heid et al. | 564/251 |
| 4,150,987 | 4/1979 | Anderson et al. | 430/58 |
| 4,396,694 | 8/1983 | Horie et al. | 430/58 |
| 4,420,548 | 12/1983 | Egarashi et al. | 430/59 |
| 4,423,129 | 12/1983 | Ishikawa et al. | 430/59 |
| 4,423,130 | 12/1983 | Horie et al. | 430/79 |
| 4,485,160 | 11/1984 | Suzuki et al. | 430/59 |
| 4,567,126 | 1/1986 | Emoto et al. | 430/73 |
| 4,666,809 | 5/1987 | Matsumoto et al. | 430/76 |

FOREIGN PATENT DOCUMENTS 57-201235 of 0000 Japan.
58-199353 11/1983 Japan.
0162260 8/1985 Japan.

*Primary Examiner*—John L. Goodrow
*Attorney, Agent, or Firm*—David G. Conlin; Ronald I. Eisenstein

[57] ABSTRACT

An electrophotographic photoreceptor is formed by a photosensitive layer containing a naphtylhydrazone compound of the formula:

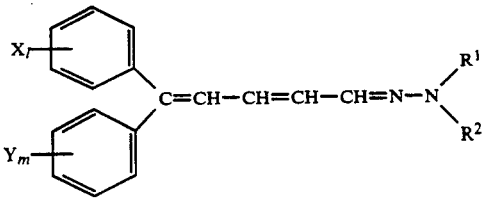

wherein X and Y are independently a hydrogen atom, lower alkyl group, lower alkoxy group, phenoxy group or arylalkoxy group; $R^1$ is a naphtyl group; $R^2$ is a hydrogen atom, lower alkyl group, allyl group, substituted or unsubstituted phenyl group, or aralkyl group; and l and m are 1 or 2. The photoreceptor thus formed is not only highly sensitive but resistant to ozone deterioration, which markedly improves the durability thereof.

8 Claims, 1 Drawing Sheet

ELECTROPHOTOGRAPHIC PHOTORECEPTOR COMPRISING A PHOTOSENSITIVE LAYER CONTAINING A NAPHTHYLHYDRAZONE COMPOUND

This is a continuation of co-pending application Ser. No. 010,329 filed on Feb. 3, 1987, now abandoned.

This invention relates to an electrophotographic photoreceptor, more particularly, to a highly sensitive electrophotographic photoreceptor comprising a photosensitive layer which contains an organophotoconductive material.

Hitherto, inorganic photoconductive materials such as selenium, cadmium sulfide, zinc oxide, etc., have been prevailingly applied to the photosensitive layer of photoreceptor for electrophotography. However, selenium and cadmium sulfide have to be recovered as poisonous substance, and further selenium is poor in heat resistance as it is crystallized when heated. Cadmium sulfide and zinc oxide are poor in moisture resistance, and zinc oxide is also deficient in printing endurance. Thus, efforts have been made for researching and developing a novel photosensitive material and novel photoreceptor.

A remarkable progress has been made recently in the studies on the use of organophotoconductive materials for the photosensitive layer of electrophotographic photoreceptor, and some of such organophotoconductive materials have been put to practical use.

The organophotoconductive materials have many advantages over the inorganic, for example, they are light in weight, it is by far easier to form a film and to produce a photosensitive layer by making use of them, and among them some are capable of producing a transparent photoreceptor.

Non-prevalence of the organophotoconductive materials for use as electrophotographic sensitive medium in spite of their many advantages such as mentioned above was due to their inferiority to the inorganic types in sensitivity and durability.

Recently, the so-called function divided type of photoreceptor—in which the generation and transfer of charge carriers are separately effected by different compounds—has become the main object of development since this type of photoreceptor is most effective in attaining high sensitivity, and some organophotoreceptors of such type have already been put to practical use.

As the transfer medium for the charge carrier, there is known either a high molecular photoconductive compound such as polyvinyl carbazole or a low molecular photoconductive compound dispersed or dissolved in a binder polymer.

The organic low molecular photoconductive compound can produce the photoreceptor excellent in mechanical properties since it is possible to select a binder polymer having excellent film-forming properties, flexibility, adhesiveness, etc., but it is difficult to find out such low molecular compound suited for making a highly sensitive photoreceptor.

In the conventional electrophotographic process, a corona discharge system has been employed for charging the surface of the photoreceptor. When repeating the charging cycles, the surface of the photoreceptor would suffer gradually from chemical degradation by the action of ozone generated by the corona discharge in the air, resulting in excessive deterioration of the initial electrical properties and in deterioration of the durability of the photoreceptor.

Various ideas have, therefore, been proposed for improving the durability of the photoreceptor. For instance, it has been tried to improve the ozone resistance of the photoreceptor itself, thereby preventing its surface deterioration. It has been also attempted to design the apparatus so that the photoreceptor would be kept unexposed to the generated active species such as the ozone as much as possible.

Hydrazone compounds analogous in structure to the compound of this invention are disclosed in Japanese Patent Application Laid-Open (KOKAI) Nos. 59-15251, 59-114545, 59-157643 and 60-162260, but any of these hydrazone compounds is unable to satisfy both requirements for sensitivity and ozone resistance. Thus, there has been available no photosensitive medium which could meet the both requirements, high sensitivity and ozone resistance, especially when it is charged positively.

The object of the invention is to find such organic low molecular photoconductive compounds capable of providing a photoreceptor for electrophotography with high sensitivity and excellent ozone resistance. The other object of the invention is to produce a electrophotographic graphic photoreceptor by means of such low molecular organophotoconductive compounds. Another objects of the invention will be apparent from the descriptions hereinafter described.

According to the present invention, it has been found that a specific naphthylhydrazone compounds are best suited for attaining said objects.

The present invention provides a photoreceptor for electrophotography comprising a photosensitive layer which contains one or more naphthylhydrazone compounds represented by the following formula I:

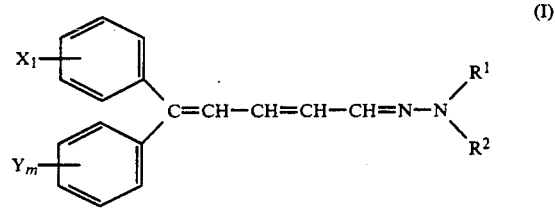

wherein X and Y independently represent a hydrogen atom, a lower alkyl group, a lower alkoxyl group, a phenoxy group or an arylalkoxyl group; $R^1$ represents a naphthyl group; $R^2$ represents a hydrogen atom, a lower alkyl group, an allyl group, a substituted or unsubstituted phenyl group, or an aralkyl group; and l and m represent a number of 1 or 2, respectively.

The present invention will be described more in detail hereinbelow.

The electrophotographic photoreceptor according to this invention is formed by disposing the naphthylhydrazone compound of the above formula I in its photosensitive layer.

In the formula I, X and Y are independently a hydrogen atom; a lower alkyl group such as methyl, ethyl, propyl, butyl, hexyl, etc.; a lower alkoxy group such as methoxy, ethoxy, propoxy, butoxy, etc.; or an arylalkoxyl group such as phenoxy, benzyloxy, phenethyloxy, etc., and when either or both of l and m are an integer of 2, two Xs or two Ys may be the same or different. $R^1$ is a α- or β-napthyl group, and $R^2$ is a hydrogen atom;

a lower alkyl group such as methyl, ethyl, propyl, butyl, etc.; an aryl group; a phenyl group; a substituted phenyl group such as tolyl, anisyl, chlorophenyl, etc.; or an aralkyl group such as benzyl, phenethyl, etc. The letters l and m are the integer of 1 or 2.

In the formula I, preferably X and Y are both hydrogen atom and $R^2$ is the phenyl group.

The naphthylhydrazone compounds represented by the formula I may be produced by any known method.

For instance, the compound can be obtained by reacting an aldehyde represented by the formula II:

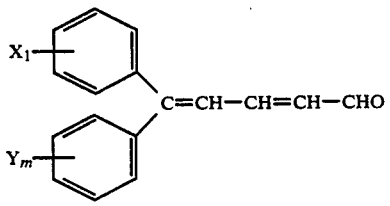

(II)

wherein X, Y, l and m are as defined above in connection with the formula I, with hydrazine represented by the formula III:

(III)

wherein $R^1$ and $R^2$ are as defined above in connection with the formula I, or with chloride or sulphate thereof in a solvent inert to the reaction, for example, an aromatic hydrocarbon such as benzene, toluene, chlorobenzene, etc.; an alcohol such as methanol, ethanol, butanol, etc.; an ether such as tetrahydrofuran, 1,2-dimethoxyethane, 1,4-dioxane, etc.; a cellosolve such as methyl cellosolve, ethyl cellosolve, etc.; N,N-dimethylformamide; dimethyl sulfoxide; N-methylpyrrolidone and the like, at a temperature of 10° to 200 ° C., preferably 20° to 100 ° C. If desired, p-toluenesulfonic acid, benzenesulfonic acid, hydrochloric acid, sulfuric acid, potassium acetate, sodium acetate or the like may be added for promoting the reaction.

The photoreceptor for electrophotography according to the invention has the photosensitive layer containing one or more of the naphthylhydrazone compounds of the formula I.

The naphthylhydrazone compounds according to the invention exhibit a very excellent performance as an organophoto-semiconductor. Especially when used as the charge transfer medium, the compounds can impart particularly high sensitivity and excellent durability to the photosensitive layer or photoreceptor into which the compounds are to be included.

There are known a variety of forms of photosensitive layer constituting the photoreceptor for electrophotography. The photosensitive layer of the electrophotographic photoreceptor according to the invention may be any one of such known forms. For example, the photosensitive layer used in this invention may be the one formed by adding in a binder the naphthylhydrazone compound and, if necessary, a dye or electron attracting compound serving as a sensitizer, or the one formed by adding in a binder the hydrazone compound and the photoconductive particles capable of forming charge carriers at an extremely high efficiency when exposed to the actinic light, or the one consisting of a charge transfer layer composed of the hydrazone compound and a binder and a laminated charge generation layer composed of the photoconductive particles capable of generating charge carriers at an extremely high efficiency upon absorption of the actinic light optionally together with the binder.

In those photosensitive layer, the known hydrazone compound having the excellent performance as an organophoto-semiconductor may be added in admixture with the naphthylhydrazone compound of the formula I.

In accordance with the present invention, the naphthylhydrazone compound is preferably included in the charge transfer layer of the photoreceptor which consists of the charge transfer layer and the charge generation layer. Then, the resultant photoreceptor is especially high in sensitivity and low in residual potential, and even after repeated cyclic use, is minimized in change of surface potential, drop of sensitivity and accumulation of residual potential and is further excellent in the durability as well.

The electrophotographic photoreceptor according to the invention may be produced by the conventional method, for instance, by applying on a conductive substrate a coating solution obtained by dissolving the naphthylhydrazone compound of the formula I together with the binder in a suitable solvent and, if necessary, further adding thereto the photoconductive particles capable of generating charge carriers at a very high efficiency upon absorption of the actinic light, a sensitizing dye, an electron attracting compound and/or other additives such as plasticizer, pigment, etc., and drying the coat to form the photosensitive layer with a thickness of usually several to several ten microns. In the case of the photoreceptor consisting of both the charge generation layer and the charge transfer layer, the coating solution above may be applied on the charge generation layer or the charge generation layer may be formed on the charge transfer layer obtained by applying the coating solution.

The solvent used for the preparation of the coating solution is selected from those which can dissolve the hydrazone compounds, the examples of such solvents including ethers such as tetrahydrofuran, 1,4-dioxane, etc.; ketones such as methyl ethyl ketone, cyclohexanone, etc.; aromatic hydrocarbon such as toluene, xylene, etc.; non-protonic polar solvents such as N,N-dimethylformamide, acetonitrile, N-methylpyrrolidone, dimethyl sulfoxide, etc.; esters such as ethyl acetate, methyl formate, methyl cellosolve acetate, etc.; and chlorinated hydrocarbons such as dichloroethane, chloroform, etc. It is of course necessary to select one which can dissolve the binder, too. As the binder, there can be mentioned polymers and copolymers of vinyl compounds such as styrene, vinyl acetate, vinyl chloride, acrylate, methacrylate, butadiene, etc., and other polymers having the compatibility with hydrazones, such as polyvinyl acetal, polycarbonate, polyester, polysulfone, polyphenylene oxide, polyurethane, cellulose ester, cellulose ether, phenoxy resin, silicon resin and epoxy resin. The binder is present in an amount of usually 0.5 to 30 times, preferably 0.7 to 10 times by weight of the amount of hydrazone.

The photoconductive particles, dye, pigment and electron attracting compound optionally added to the photosensitive layer may be the known ones. As the photoconductive particles capable of generating the charge carriers at a prominently high efficiency upon absorption of the actinic light, there can be included the inorganic photoconductive particles such as the particles of selenium, selenium-tellurium alloy, selenium-arsenic alloy, cadmium sulfide, amorphous silicon, etc., and the organic photoconductive particles such as the particles of copper phthalocyanine, perinone pigment, thioindigo, quinacridone, perylene pigment, anthraquinone pigment, azo pigment, bisazo pigment, cyanine pigment, etc. The dyes usable in this invention include triphenylmethane dyes such as methyl violet, Brilliant Green, crystal violet, etc., thiazine dyes such as methylene blue, quinone dyes such as quinizarin, cyanine dyes, pyrylium salts, thiapyrylium salts, benzopyrylium salts and the like. As the electron attracting compound forming a charge transfer complex with the hydrazone compound, there can be mentioned the quinones such as chloranil, 2,3-dichloro-1,4-naphthoquinone, 1-nitroanthraquinone, 1-chloro-5-nitroanthraquinone, 2-chloroanthraquinone and phenanthrenequinone, aldehydes such as 4-nitrobenzaldehyde, ketones such as 9-benzoylanthracene, indandione, 3,5-dinitrobenzophenone, 2,4,7-trinitrofluorenone, 2,4,5,7-tetranitrofluorenone and 3,3',5,5'-tetranitrobenzophenone, acid anhydrides such as phthalic anhydride and 4-chloronaphthalic anhydride, cyano compounds such as tetracyanoethylene, terephthalalmalononitrile, 9-anthrylmethylidenemalononitrile, 4-nitrobenzalmalononitrile and 4-(p-nitrobenzoyloxy)benzalmalononitrile, and phthalides such as 3-benzalphthalide, 3-(α-cyano-p-nitrobenzal)phthalide and 3-(α-cyano-p-nitrobenzal)-4,5,6,7-tetrachlorophthalide.

The photosensitive layer of the electrophotographic photoreceptor according to the invention may additionally contain a known type of plasticizer for improving the film-forming properties, flexibility and mechanical strength thereof. As the plasticizer to be added to the coating solution for those purposes, there can be used the aromatic compounds such as phthalic acid ester, phospholic acid ester, epoxy compound, chlorinated paraffin, chlorinated fatty acid ester and methylnaphthalene. In case of using the naphthylhydrazone compound as the charge transfer medium in the charge transfer layer, the coating solution may be of the composition above-mentioned, but in this case, the photoconductive particles, dye, pigment and electron attracting compound may be excluded or added only in small quantities. The charge generation layer provided in this case may be a thin layer formed by applying a coating solution obtained by dissolving or dispersing the photoconductive particles and, if necessary, the binder polymer, organic photoconductive material, dye, pigment, electron attracting compound, etc., and drying the coat, or a thin filmy layer formed from the photoconductive particles by vacuum deposition or other means.

The photoreceptor formed in the manner described in the foregoings may additionally have an adhesive layer, an intermediate layer, a transparent insulating layer etc., as desired. As the conductive substrate on which the photosensitive layer is formed, any of the known types generally used for the electrophotographic photoreceptor can be employed in this invention. Typical examples of such substrate are a drum or sheet made of a metal such as aluminum, stainless steel, copper, etc., and a laminate or deposit of these metal foils. It is also possible to use a plastic film, plastic drum, paper, paper tube, etc., which has been subjected to a conductive treatment by applying a conductive material such as metal powder, carbon black, copper iodide, high molecular electrolyte, etc., together with a proper binder. Further, a plastic sheet or drum which is made conductive by containing a conductive material such as metal powder, carbon black, carbon fiber, etc., is usable.

The compounds of this invention can provide a photoreceptor having very high sensitivity and very excellent ozone resistance in comparison with the conventional materials either in case the photoreceptor is prepared from a dispersion system formed by mixing the compound of this invention with the charge generating agent (for example, known bisazo pigment) and such photoreceptor is charged positively, or in case the photoreceptor is prepared by either laminating the charge generation layer containing the charge generating agent on the charge transfer layer containing the compound of this invention or laminating vice versa and such photoreceptor is charged negatively.

The present invention will hereinafter be described in further detail referring to the Examples, which are merely illustrative and by no means understood to be limitative to the scope of the invention hereinafter claimed. In the following Examples, all "parts" are by weight unless otherwise indicated.

PREPARATION EXAMPLE 1

Into 150 parts of methyl alcohol, 3.5 parts (0.015 mol) of N-amino-N-phenyl-α-naphthylamine(1-(1-phenylhydrazino)naphthaline) and 3.0 parts (0.013 mol) of aldehyde represented by the following formula:

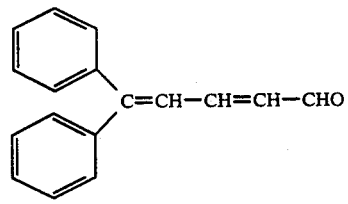

were supplied and the mixture was stirred under reflux in a nitrogen atmosphere for 2 hours. After allowing the mixture to cool, the precipitated yellow crystals were filtered out to obtain 3.2 parts of crude product.

Then, this crude product was subjected to the purification by known column chromatography to obtain 2.7 parts of pure product in the form of yellow powder having a melting point of 164.0°–165.0° C.

This compound was determined to be a compound represented by the following formula from the results of elemental analysis, mass spectrometric analysis and infrared spectral analysis (FIG. 1) listed below.

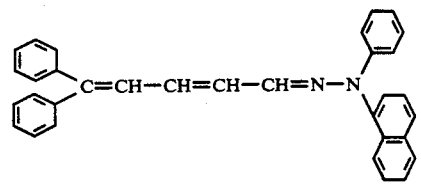

|  | Elemental analysis | | |
| --- | --- | --- | --- |
|  | C (%) | H (%) | N (%) |
| Calculated | 88.00 | 5.78 | 6.22 |
| Found | 87.80 | 5.75 | 6.20 |

Mass Spectrometric Analysis

Calcd. as $C_{33}H_{26}N_2$: MW=450.
M+ =450.

IR Absorption Spectrum

Shown in FIG. 1.

EXAMPLE 1

1.4 Parts of a bisazo pigment of naphthalic acid type having the following structure:

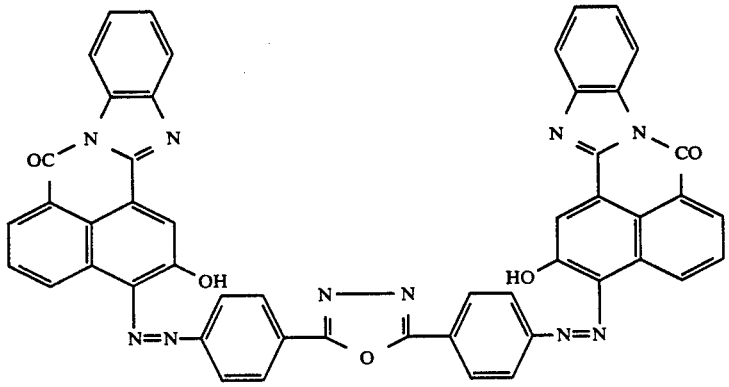

and 2.8 g of polyvinyl butyral (S-Lec B manufactured by Sekisui Chemical Co. Ltd.) were dispersed and broken into finely divided particles in 100 g of tetrahydrofuran by sand grinder.

The resultant dispersion was coated on an aluminum deposit on a 75 μm thick polyester film by using a wire bar so that the coated weight after drying would amount to 0.3 g/m², and then the coat was dried to form a charge generation layer.

On this charge generation layer was applied a coating solution obtained by dissolving 90 parts of the naphthylhydrazone compound prepared in Preparation Example 1 and 100 parts of a polymethyl methacrylate resin (BR-85 manufactured by Mitsubishi Rayon Co., Ltd.) in 750 parts of dioxane, and the coat was dried to form a 24 μm thick charge transfer layer.

An electrophotographic photoreceptor thus obtained is the dual-layered type. Measuring its sensitivity, that is, half-decay exposure ($E_{178}$), it is 0.7 lux·sec, and the residual potential is 40 V.

The half-decay exposure is determined by first charging the photoreceptor in a dark place by −5.2 KV corona discharge, then exposing it to the incandescent light and measuring the exposure required for reducing the surface potential to ½ of the initial surface potential.

Another photoreceptor was produced in the same manner as described above except that the polymethyl methacrylate, the binder of the charge transfer layer, was replaced by a polycarbonate resin (Novalex 7025A manufactured by Mitsubishi Chemical Industries Ltd.). This photoreceptor was exposed to an atmosphere containing 5 to 10 ppm (calcd. as ozone concentration) of corona gas for 14 hours to subject to forced deterioration.

Thereafter, the change of charging characteristics of the photoreceptor was measured in the same way as described above. It was found that 95% of the initial charged potential was retained, indicating excellent ozone resistance of the photoreceptor.

EXAMPLE 2

110 Parts of a 10% by weight tetrahydrofuran solution of polymethyl methacrylate resin BR-85, 100 parts of the naphthylhydrazone prepared in Preparation Example 1 and 2 parts of an electron attracting compound represented by the following structural formula:

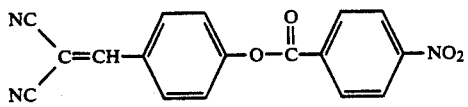

were mixed and dissolved uniformly.

Then, this solution together with 10 parts of the bisazo pigment dispersion used in Example 1 was subjected to a dispersing treatment by sand grinder.

The resulting dispersion was coated on an aluminum deposit on a 75 μm thick polyester film so that the coating thickness after drying would amount to 22.5 μm, and the coat was dried to obtain a photoreceptor.

The positively charged electrophotographic characteristics of the photoreceptor were determined by means of Paper Analyzer SP-428 provided by Kawaguchi Denki KK. The initial potential after charging with +7.0 KV corona voltage was +705 V, the half-decay exposure was 1.2 lux·sec and the residual potential was 21 V.

This photoreceptor was also subjected to the forced deterioration in the same way as conducted in Example 1 and the change of the charged potential was determined. It was found that 90% of the initial charged potential was retained, expressing the excellent ozone resistance of the photoreceptor.

COMPARATIVE EXAMPLES 1 TO 3

For clarifying the specific characteristics (sensitivity and ozone resistance) of the compounds of this invention, there were prepared photoreceptor by incorporating thereinto the known hydrazones shown in Table 1 and their sensitivity and ozone resistance were measured by charging them positively or negatively.

The photoreceptor for negative charging was prepared according to the procedures of Example 1 except for use of the known hydrazones as the charge transfer material, and its sensitivity and ozone resistance were measured. On the other hand, the photoreceptor for positive charging was prepared according to the procedures of Example 2, and its sensitivity and ozone resistance were measured.

The results are shown in Table 1 along with the results of Examples 1 and 2.

EXAMPLES 5 to 9.

TABLE 1

| Hydrazone | Negative charging | | Positive charging | |
|---|---|---|---|---|
| | Sensitivity (lux · sec) | Ozone resistance (rate of charge retention) | Sensitivity (lux · sec) | Ozone resistance (rate of charge retention) |
| Comp. Example 1 (9-ethylcarbazole-3-carbaldehyde diphenylhydrazone) | 10 | 90 (%) | 1.1 | 12 (%) |
| Comp. Example 2 (xanthylidene structure) | 1.5 | 92 | 1.4 | 32 |
| Comp. Example 3 (bis(4-methoxyphenyl) structure) | 1.4 | 90 | 1.3 | 17 |
| Examples 1 and 2 (diphenyl-butadienyl naphthylhydrazone) | 0.7 (Example 1) | 95 | 1.2 (Example 2) | 90 |

As seen from the above, the naphthylhydrazone compounds of this invention, when used for the photoreceptor, showed the very excellent characteristics in sensitivity and ozone resistance no matter whether the photoreceptor was charged positively or negatively.

The photoreceptors were prepared in the same manner as Example 1 except that the naphthylhydrazone compounds shown in Table 2 below were used in place of the naphtylhydrazone compound of Example 1, and their sensitivity and ozone resistance were measured and tabulated in Table 2.

TABLE 2

[Structure: Naphthylhydrazone compound with X$_l$ substituent on upper phenyl ring (positions 1-6) and Y$_m$ on lower phenyl ring (positions 1'-6'), connected via =CH—CH=CH—CH=N—NR$^1$R$^2$]

| Example No. | X$_l$ | Y$_m$ | R$^1$ | R$^2$ | Sensitivity E$_{\frac{1}{2}}$ lux·sec | Ozone resistance Rate of charge retention % |
|---|---|---|---|---|---|---|
| 5 | —H | —H | [2-naphthyl] | —CH$_3$ | 1.8 | 95 |
| 6 | —CH$_3$ at 4-position | —CH$_3$ at 4'-position | " | [phenyl] | 1.2 | 93 |
| 7 | —OCH$_3$ at 2-position —OCH$_3$ at 4-position (l = 2) | —H | " | —CH$_2$CH=CH$_2$ | 1.3 | 97 |
| 8 | —OCH$_3$ at 4-position | —OCH$_3$ at 4'-position | " | —CH$_2$—[phenyl] | 1.1 | 96 |
| 9 | —O—[phenyl] at 4-position | —OCH$_2$CH$_2$—[phenyl] at 4'-position | [1-naphthyl] | [4-Cl-phenyl] | 2.3 | 95 |

What is claimed is:

1. An electrophotographic photoreceptor comprising a photosensitive layer which contains one or more naphthylhydrazone compounds represented by the formula:

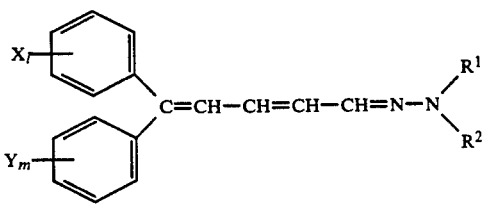

wherein X and Y independently represent a hydrogen atom, a lower alkyl group, a lower alkoxyl group, a phenoxy group or an arylalkoxyl group; R$^1$ represents a naphthyl group; R$^2$ represents a hydrogen atom, a lower alkyl group, an allyl group, a substituted or unsubstituted phenyl group, or an aralkyl group; and l and m are an integer of 1 or 2.

2. The electrophotographic photoreceptor of claim 1, wherein the photosensitive layer consists of a charge transfer layer which includes the naphthylhydrazone compound, and a charge generation layer.

3. The electrophotographic photoreceptor of claim 2, wherein the charge transfer layer is composed of the naphthylhydrazone compound and a binder and the charge generation layer is composed of photoconductive particles capable of generating charge carriers.

4. The electrophotographic photoreceptor of claim 3, wherein the charge generation layer contains a binder.

5. The electrophotographic photoreceptor of claim 1, wherein the photosensitive layer is formed by adding in a binder the naphthylhydrazone compound.

6. The electrophotographic photoreceptor of claim 5, wherein the photosensitive layer further contains a dye or electron attracting compound serving as a sensitizer.

7. The electrophotographic photoreceptor of claim 1, wherein the photosensitive layer is formed by adding in the binder the naphthylhydrazone compound and photoconductive particles capable of forming charge carriers.

8. The electrophotographic photoreceptor of claim 1, wherein both X and Y are hydrogen atoms and R$^2$ is the phenyl group.

* * * * *

UNITED STATES PATENT AND TRADEMARK OFFICE
CERTIFICATE OF CORRECTION

PATENT NO. : 5,290,649
DATED : March 1, 1994
INVENTOR(S) : Tetsumi Suzuki, et al It is certified that error appears in the above-indentified patent and that said Letters Patent is hereby corrected as shown below:

On title page, item [22], "Sep. 16, 1988" should read --Sep. 19, 1988--.

Signed and Sealed this

Sixteenth Day of August, 1994

*Attest:*

BRUCE LEHMAN

*Attesting Officer*     *Commissioner of Patents and Trademarks*